(12) United States Patent
Brown et al.

(10) Patent No.: US 7,979,489 B2
(45) Date of Patent: Jul. 12, 2011

(54) NOTIFYING USERS WHEN MESSAGING SESSIONS ARE RECORDED

(75) Inventors: Michael Wayne Brown, Austin, TX (US); Rabindranath Dutta, Austin, TX (US); Michael A. Paolini, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1084 days.

(21) Appl. No.: 11/741,743

(22) Filed: Apr. 28, 2007

(65) Prior Publication Data

US 2007/0201637 A1    Aug. 30, 2007

Related U.S. Application Data

(63) Continuation of application No. 09/915,540, filed on Jul. 26, 2001, now Pat. No. 7,257,617.

(51) Int. Cl.
*G06F 15/16* (2006.01)
*G06F 3/00* (2006.01)

(52) U.S. Cl. ........ 709/204; 709/205; 709/206; 715/751; 715/752; 715/753

(58) Field of Classification Search .................. None
See application file for complete search history.

(56) References Cited

U.S. PATENT DOCUMENTS

| | | |
|---|---|---|
| 4,569,015 A | 2/1986 | Dolev et al. |
| 5,440,624 A | 8/1995 | Schoof, II |
| 5,557,678 A | 9/1996 | Ganesan |
| 5,619,555 A | 4/1997 | Fenton et al. |
| 5,710,591 A | 1/1998 | Bruno et al. |
| 5,826,022 A | 10/1998 | Nielsen |
| 5,828,835 A | 10/1998 | Isfeld et al. |
| 6,061,448 A | 5/2000 | Smith et al. |
| 6,105,012 A | 8/2000 | Chang et al. |
| 6,215,877 B1 | 4/2001 | Matsumoto |
| 6,341,349 B1 | 1/2002 | Takagari et al. |
| 6,347,373 B1 | 2/2002 | Hoepman et al. |
| 6,356,935 B1 | 3/2002 | Gibbs |
| 6,357,006 B1 | 3/2002 | Pham et al. |
| 6,377,944 B1 | 4/2002 | Busey et al. |
| 6,463,462 B1 | 10/2002 | Smith et al. |

(Continued)

FOREIGN PATENT DOCUMENTS

WO    WO99/48011    9/1999

OTHER PUBLICATIONS

Fimeza et al. "Realcast-Real-Time Services With IP Multicast" Nov. 2000 Eurescom Project P1010.

(Continued)

*Primary Examiner* — Hassan Phillips
(74) *Attorney, Agent, or Firm* — Matthew W. Baca; Amy J. Pattillo

(57) ABSTRACT

A method, system and program for notifying users when messaging sessions are recorded are provided. In response to receiving a request to record a messaging session, a requested selection of multiple message entries associated with the messaging session are recorded. Then, multiple users participating in the messaging session are notified of the recording of the requested selection of the multiple message entries from the messaging session. In particular, the output of the messaging session is adjusted for each of the multiple users to distinguish a selection from among the multiple message entries being recorded.

20 Claims, 6 Drawing Sheets

U.S. PATENT DOCUMENTS

| | | |
|---|---|---|
| 6,532,477 B1 | 3/2003 | Tang et al. |
| 6,535,909 B1 | 3/2003 | Rust |
| 6,564,244 B1 * | 5/2003 | Ito et al. .................. 709/204 |
| 6,625,734 B1 | 9/2003 | Marvit et al. |
| 6,754,822 B1 | 6/2004 | Zhao |
| 6,760,443 B2 | 7/2004 | Lacy et al. |
| 6,784,901 B1 | 8/2004 | Harvey et al. |
| 6,820,202 B1 | 11/2004 | Wheeler et al. |
| 6,987,841 B1 | 1/2006 | Byers et al. |
| 7,031,326 B1 * | 4/2006 | Shur et al. .................. 709/204 |
| 7,043,529 B1 | 5/2006 | Simonoff |
| 7,185,057 B2 | 2/2007 | Brown |
| 7,257,617 B2 | 8/2007 | Brown |
| 7,269,622 B2 | 9/2007 | Brown |
| 2002/0002584 A1 * | 1/2002 | Takagi et al. ............ 709/204 |
| 2002/0065896 A1 | 5/2002 | Burakoff |
| 2003/0020750 A1 | 1/2003 | Brown |
| 2003/0021416 A1 | 1/2003 | Brown |
| 2003/0023681 A1 | 1/2003 | Brown |
| 2003/0023689 A1 | 1/2003 | Brown |
| 2003/0023850 A1 | 1/2003 | Brown |
| 2004/0054728 A1 | 3/2004 | Rust |

OTHER PUBLICATIONS

U.S. Appl. No. 09/915,540, filed Jul. 26, 2001, Michael Wayne Brown et al, Office Action, mailing date Mar. 6, 2006, 5 pages.

U.S. Appl. No. 09/915,540, filed Jul. 26, 2001, Michael Wayne Brown et al, Office Action, mailing date May 5, 2006, 21 pages.

U.S. Appl. No. 09/915,540, filed Jul. 26, 2001, Michael Wayne Brown et al, Office Action, mailing date Oct. 23, 2006, 15 pages.

U.S. Appl. No. 09/915,540, filed Jul. 26, 2001, Michael Wayne Brown et al, Notice of Allowance, mailing date Apr. 11, 2007, 3 pages.

* cited by examiner

| USER ID | AUTOMATIC AGREE | AUTOMATIC AGREE | NOTIFICATIONS | AUTHORIZATION LEVELS |
|---|---|---|---|---|
| USER A | USER B<br>USER D<br>USER G<br>USER X | USER C<br>USER F<br>USER Y | HOME - TEXT REF<br>PORTABLE - AUDIBLE, GRAPHICAL<br>PDA - GRAPHICAL | GENERAL<br>MANAGER<br>PARENT |
| USER B | USER F<br>USER G<br>USER Z | USER C<br>USER H<br>USER X | HOME - TEXT REF, AUDIBLE<br>WORK - GRAPHICAL | GENERAL<br>WORK LEVEL 3<br>BOARD MEMBER |

*FIG. 6*

| CHANNEL | AUTHORIZATION |
|---|---|
| A | GENERAL USER PARTICIPATING |
| B | MANAGERS PARTICIPATING |
| C | ONLY CORPORATION MAY RECORD |
| D | NONE |

*FIG. 7*

NOTIFYING USERS WHEN MESSAGING SESSIONS ARE RECORDED

CROSS-REFERENCE TO RELATED APPLICATIONS

This application is a continuation of commonly assigned U.S. Pat. No. 7,257,617, U.S. patent application Ser. No. 09/915,540, filed Jul. 26, 2001, which is hereby incorporated herein by reference.

BACKGROUND OF THE INVENTION

1. Technical Field

The present invention relates in general to electronic communications and, in particular, to recording messaging sessions. Still more particularly, the present invention relates to enabling users to record a messaging session and notifying other users participating in the messaging session that the session is being recorded.

2. Description of the Related Art

As the Internet and telephony expand, the ease of communications between individuals in different locations continues to expand as well. One type of electronic communication is supported by messaging which includes the use of computer systems and data communication equipment to convey messages from one person to another, as by e-mail, voice mail, unified messaging, instant messaging, or fax.

While e-mail has already expanded into nearly every facet of the business world, other types of messaging continue to forge into use. For example, instant messaging systems are typically utilized in the context of an Internet-supported application that transfers text between multiple Internet users in real time.

In particular, the Internet Relay Chat (IRC) service is one example of instant messaging that enables an Internet user to participate in an on-line conversation in real time with other users. An IRC channel, maintained by an IRC server, transmits the text typed by each user who has joined the channel to the other users who have joined the channel. An IRC client shows the names of the currently active channels, enables the user to join a channel, and then displays the other channel participant's words on individual lines so that the user can respond.

Similar to IRC, chat rooms are often available through on-line services and provide a data communication channel that links computers and permits users to converse by sending text messages to one another in real-time.

For typical telephone systems, regulations often require that a notification be provided to callers when a telephone conversation is being recorded by one of the parties. For example, a beep tone repeated at an interval throughout a conversation is often an indication that the conversation is being recorded. In another example, a voice notification such as "This conversation may be recorded" may be utilized to notify callers that a conversation is or may be recorded.

Instant messaging sessions continue to replace and/or supplement telephone conversations in business and personal contexts, however instant messaging sessions are limited in that where messaging sessions may be recorded, the user is not provided with the ability to set parameters for recording a messaging session, such as which user's entries to record.

Further, current messaging systems are limited in that where a messaging session may be saved, the systems do not provide for other users to be notified that the messaging session has been recorded in some form. In business contexts where confidential information is shared in an instant messaging system, such a limitation becomes even more prevalent.

In view of the foregoing, it would be advantageous to provide a method, system and program for recording and saving messaging sessions. In particular, it would be advantageous to provide a method, system and program for notifying users participating in a messaging session when that messaging session is recorded and allowing users to agree to the recording.

SUMMARY OF THE INVENTION

In view of the foregoing, it is therefore an object of the present invention to provide an improved method, system and program for performing electronic communications.

It is another object of the present invention to provide a method, system and program for recording messaging sessions.

It is yet another object of the present invention to provide a method, system and program for enabling users to record a messaging session and then notifying users participating in the messaging session that the session is being recorded.

According to one aspect of the present invention, in response to receiving a request to record a messaging session, a requested selection of multiple message entries associated with the messaging session are recorded. Multiple users participating in the messaging session are notified of the recording of the requested selection of the multiple message entries from the messaging session.

According to another aspect of the present invention, outputs to a user participating in a messaging session of entries associated with the messaging session from multiple users participating in the messaging session are controlled. Then, in response to receiving a recording indicator for the messaging session, the outputs for the messaging session are adjusted to distinguish a selection from among the multiple message entries being recorded, such that a user participating in the messaging session is notified when message entries posted by that user and the other users are being recorded.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 illustrates a block diagram of a data storage structure for recording preferences according to user identification in accordance with the method, system and program of the present invention;

FIG. 7 depicts a table of channel options set for a channel in accordance with the method, system and program of the present invention;

DETAILED DESCRIPTION OF THE PREFERRED EMBODIMENT

A method, system and program for recording messaging session entries and notifying users when messaging session entries are being recorded or have been recorded are provided.

A "messaging session" preferably includes, but is not limited to, any combination of voice, graphical, video, and/or text messages, instant and/or delayed, transmitted between multiple users via a network. Messaging sessions may include use of chat rooms, instant messages, e-mail, IRC, conference calling and other network methods of providing a channel for users to communicate within. Further, messaging sessions may include communications such as voice, video, and text transmissions between multiple telephony devices.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

The present invention may be executed in a variety of systems, including a variety of computing systems and electronic devices under a number of different operating systems. In one embodiment of the present invention, the messaging system is a portable computing system such as a notebook computer, a palmtop computer, a personal digital assistant, a telephone or other electronic computing system that may also incorporate communications features that provide for telephony, enhanced telephony, messaging and information services. However, the messaging system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Figure 1:
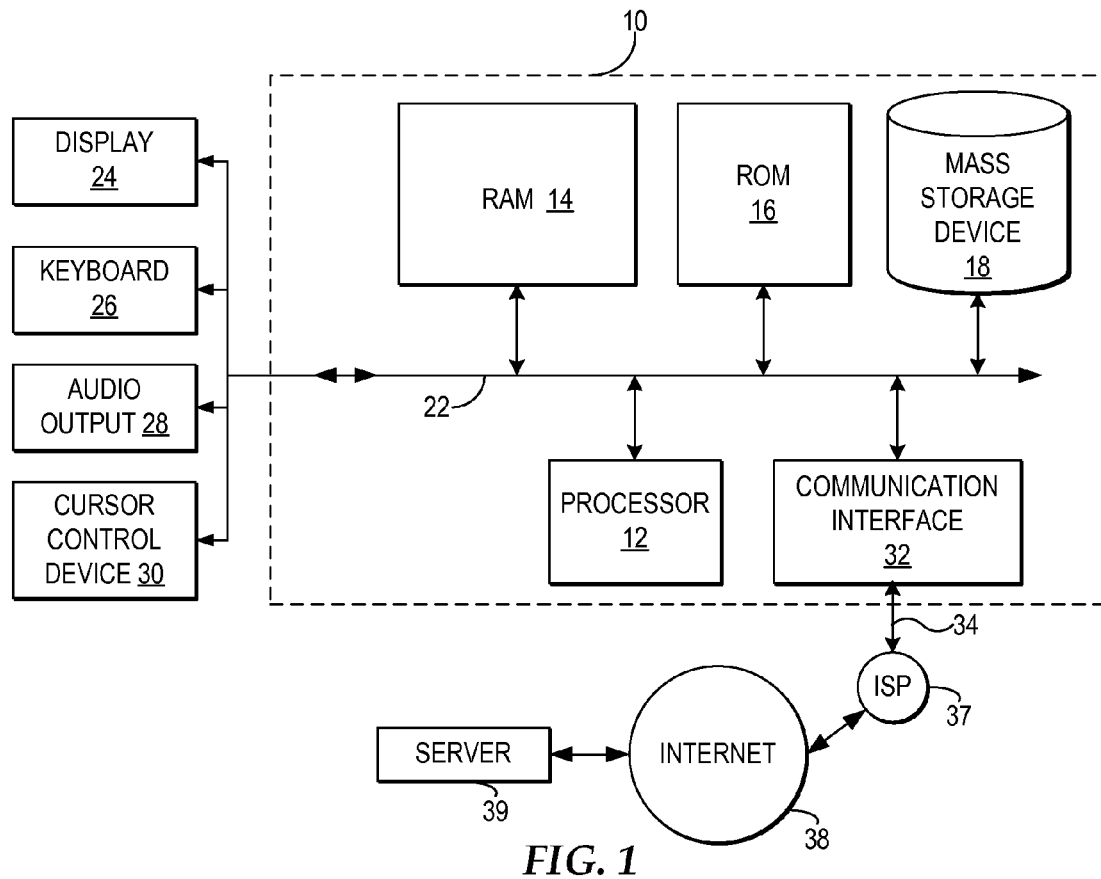
FIG. 1 depicts one embodiment of a computer system with which the method, system and program of the present invention may advantageously be utilized.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 8, 9, and others described herein. Alternatively, the steps of the present invention might be performed by specific hardware components that contain hardwire logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patters of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of non-volatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. A keyboard 26 and cursor control device 30, such as a mouse, trackball, or cursor direction keys, are coupled to bus 22 as interfaces for user inputs to computer system 10. In alternate embodiments of the present invention, additional input and output peripheral components may be added.

Messages System Context

Figure 2:
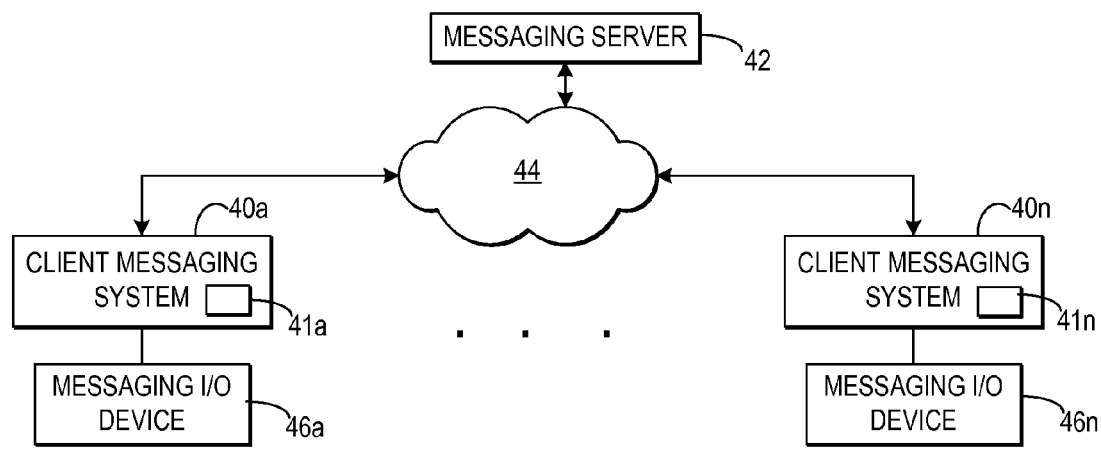
FIG. 2 illustrates a simplified block diagram of a client/server environment in which electronic messaging typically takes place in accordance with the method, system and program of the present invention.

With reference now to FIG. 2, there is depicted a simplified block diagram of a client/server environment in which electronic messaging typically takes place in accordance with the method, system and program of the present invention. The client/server environment is implemented within multiple network architectures. For example, the architecture of the World Wide Web (the Web) follows a traditional client/server modeled environment.

The terms "client" and "server" are used to refer to a computer's general role as a requester of data (the client) or provider of data (the server). In the Web environment, web browsers such as Netscape Navigator typically reside on client messaging systems 40a-40n and render Web documents (pages) served by at least one messaging server such as messaging server 42. Additionally, each of client messaging systems 40a-40n and messaging server 42 may function as both a "client" and a "server" and may be implemented utilizing a computer system such as computer system 10 of FIG. 1. Further, while the present invention is described with emphasis upon messaging server 42 controlling a messaging session, the present invention may also be performed by client messaging systems 40a-40n engaged in peer-to-peer network communications via a network 44.

The Web may refer to the total set of interlinked hypertext documents residing on servers all around the world. Network 44, such as the Internet, provides an infrastructure for transmitting these hypertext documents between client messaging systems 40a-40n and messaging server 42. Documents (pages) on the Web may be written in multiple languages, such as Hypertext Markup Language (HTML) or Extensible Markup Language (XML), and identified by Uniform Resource Indicators (URIs) that specify the particular messaging server 42 and pathname by which a file can be accessed, and then transmitted from messaging server 42 to an end user utilizing a protocol such as Hypertext Transfer Protocol (HTTP). Web pages may further include text, graphic images, movie files, and sounds as well as Java applets and other small embedded software programs that execute when the user activates them by clicking on a link.

Advantageously, in the present invention, a client enters a message via one of messaging input/output (I/O) devices 46a-46n for a messaging session at a client messaging system such as client messaging system 40a. The message entry is transmitted to messaging server 42. Messaging server 42 then distributes the message entry to the user participating in the messaging session via network 44.

In addition, in the present invention, a user at each of client messaging systems 40a-40n may request to record or log a messaging session. Such requests are transmitted to messaging server 42. Messaging server 42 may then transmit requests to approve recording to each of the users participating in a messaging session at client messaging systems 40a-40n. Depending on the authorizations received at messaging server 42 from client messaging systems 40a-40n, the entries in the messaging session are recorded at messaging server 42, client messaging systems 40a-40n, or another data storage system accessible via network 44. In addition, an indicator is transmitted to each of client messaging systems 40a-40n to indicate which portions of a messaging session are recorded. Further, a user at each of client messaging systems 40a-40n may request to pause recording in order enter messages that are not placed on the record.

While in the present embodiment messaging server 42 handles transmission of message entries and recording activity, in alternate embodiments, recording activity may be accessible to client messaging systems 40a-40n as files in a directory that is accessible to a user. In addition, the recording activity may be transmitted as e-mail to participants in the messaging session, where the e-mail application functioning on the client messaging system automatically determines that the e-mail contains recording activity and outputs the recording activity according to user preferences. Moreover, the present invention may utilize a traditional IRC channel for transmitting message entries and a special IRC device channel opened in parallel with the traditional IRC channel for transmitting recording activity among users. Furthermore, other types of messaging systems may be utilized to implement the present invention, as will be understood by one skilled in the art.

Advantageously, according to one embodiment of the present invention, the steps of requesting to record, requesting to pause, requesting to stop recording and other functions may be performed by an application executing in each of client messaging systems 40a-40n, such as client recording applications 41a-41n. Further, client recording applications 41a-41n may monitor whether a user utilizes alternate tools and methods on client messaging systems 40a-40n to save portions or all of a messaging session and transmit a record of the recording to messaging server 42. For example, if a user selects a portion of the text portion of a messaging session and utilizes a copy function, client recording applications 41a-41n would advantageously monitor and report such activity. Messaging server 42 may then notify other users participating in the messaging session that a recording of the messaging session has been made.

Figure 3:
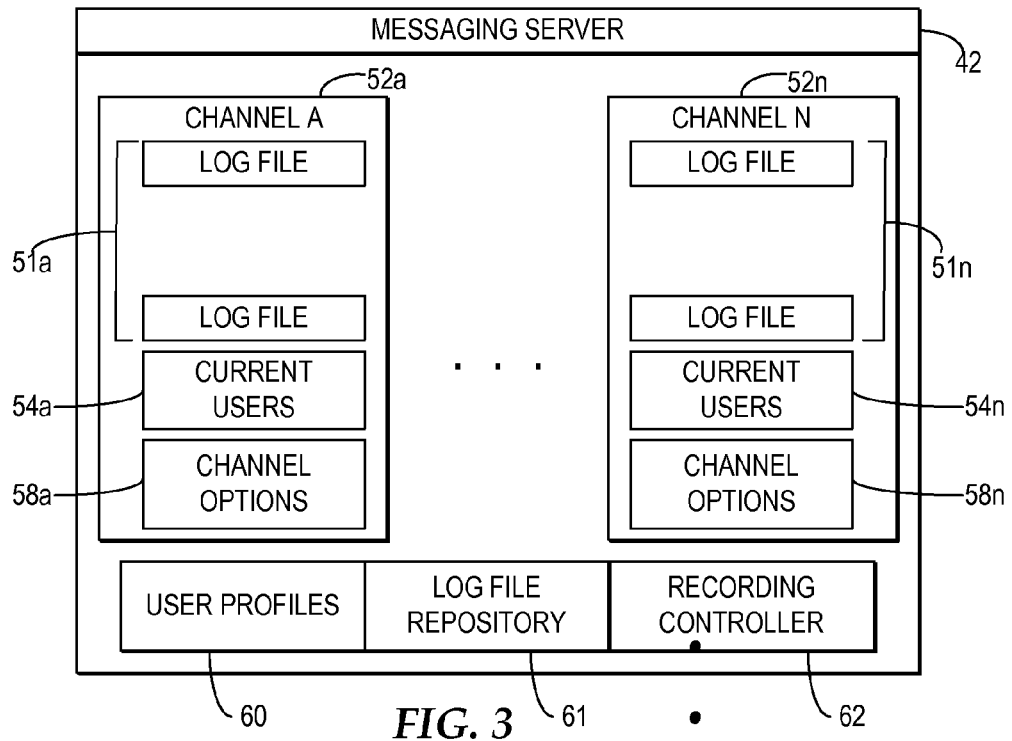
FIG. 3 depicts a block diagram of one embodiment of a messaging server in accordance with the method, system and program of the present invention.

Referring now to FIG. 3, there is illustrated a block diagram of one embodiment of a messaging server in accordance with the method, system and program of the present invention. As depicted messaging server 42 includes a recording controller 62 that is provided to control the process steps of messaging server 42 as will be further described.

Messaging server 42 also includes multiple channels 52a-52n. Each of channels 52a-52n may represent a separate information path within messaging server 42 in which multiple users may participate in a messaging session. Messaging server 42 may have a defined number of channels 52a-52n or may allow users to create new channels as needed. In particular, channels provide network paths between multiple users for both voice and text communications. Each of channels 52a-52n may further include multiple distinguishable topics.

In addition, each of channels 52a-52n preferably includes a table of current users 54a-54n. As a user selects to participate in channels 52a-52n, the user's identification is added to the table of current users 54a-54n for that channel.

Preferably, as messaging server 42 receives messages, they may be stored according to the channel, topic and user and then distributed to each of the users participating in that channel. Where both voice and text are being utilized in a single messaging session, messaging server 42 may transmit both voice and text or messaging server 42 may translate all entries into either voice or text before distributing the entries to the users participating in the channel.

Messaging entries are preferably stored within each channel in one of log files 51a-51n. Advantageously, multiple users may request to record different selections of the message entries for a messaging session where a new log file is utilized for each request. For example, one user may request to record message entries from a selection of users from among all the users while another user may request to record message entries during a particular time interval of the messaging session.

When a user has finished recording the desired portions of a messaging session, the log file for that user may be stored in a log file repository 61. Advantageously, log file repository 61 catalogs messaging session recordings such that multiple users may easily access the recordings. While in the present invention log file repository 61 is depicted within messaging server 42, in alternate embodiments log file repository 61 may be included in an alternate server system. In addition, alternatively, log files may be transmitted from messaging server 42 to client messaging systems for storage.

Messaging server 42 includes a user profiles database 60 that includes profile information for each user, including, but not limited to, a user identification, a name, an e-mail address, recording preferences and a user history recorded as the user participates in messaging sessions. The user identification stored in user profiles 60 during registration is utilized across multiple channels for identifying entries provided by that user.

Recording controller 62 is advantageously a software application executing within messaging server 42 in order to control recording of message entries according to user recording preferences, authorizations and channel options.

Channel options are included with each channel as depicted by channel options 58a-58n. Channel options preferably include authorization levels required to record message entries within a messaging session. Advantageously, channel options may be selected when a user requests a new channel. Alternatively, a user may select a channel based on the authorization levels set in the channel options for that channel. Moreover, a business or other network service provider may automatically set channel options for channels.

Figure 4:
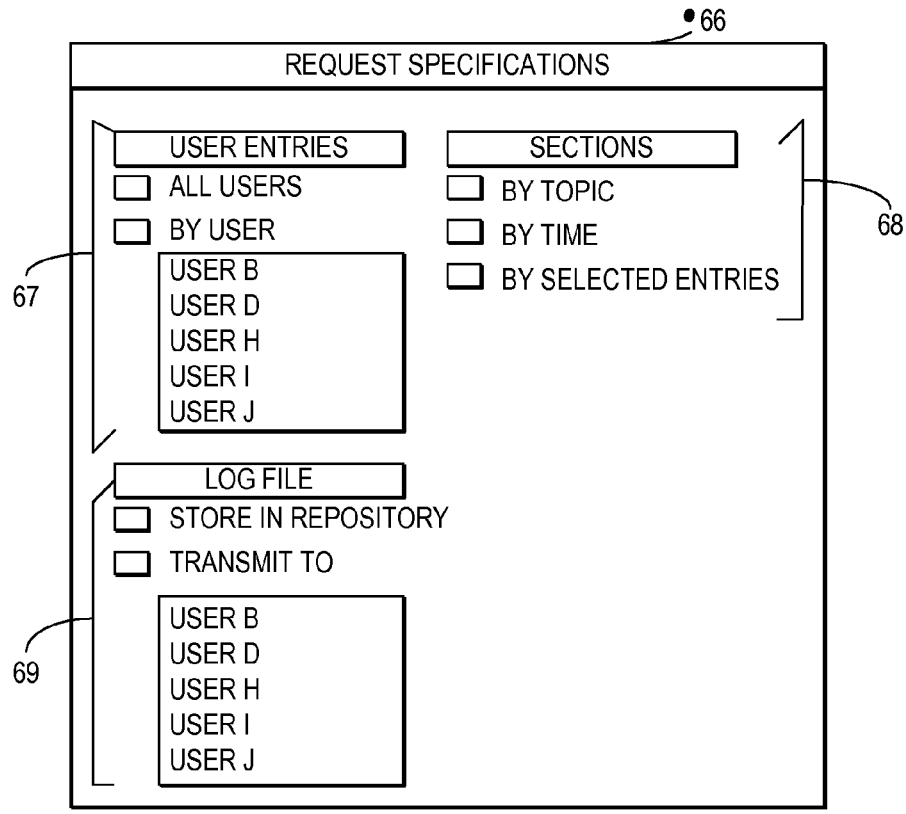
FIG. 4 illustrates a graphical representation of a recording request window in accordance with the method, system and program of the present invention.

With reference now to FIG. 4 there is illustrated a graphical representation of a recording request window in accordance with the method, system, and program of the present invention. As depicted, request specifications window 66 is provided for a user to further specify a request to record.

In the present example, request specification window 66 includes, but is not limited to, user entries 67, sections 68, and log file storage 69. In particular, a user may select which user entries to record by selecting from among the options provided in user entries 67. Further, a user may select which sections of a messaging session to record by selecting from among the options provided in sections 68. Moreover, a user may select where to store a log file recorded according to the specifications by selecting from among the options provided in log file storage 69.

Selections made in request specification window 66 are preferably transmitted to the messaging server and stored according to the user identification in order to set up the log file for recording the messaging session according to user specifications.

Figure 5:
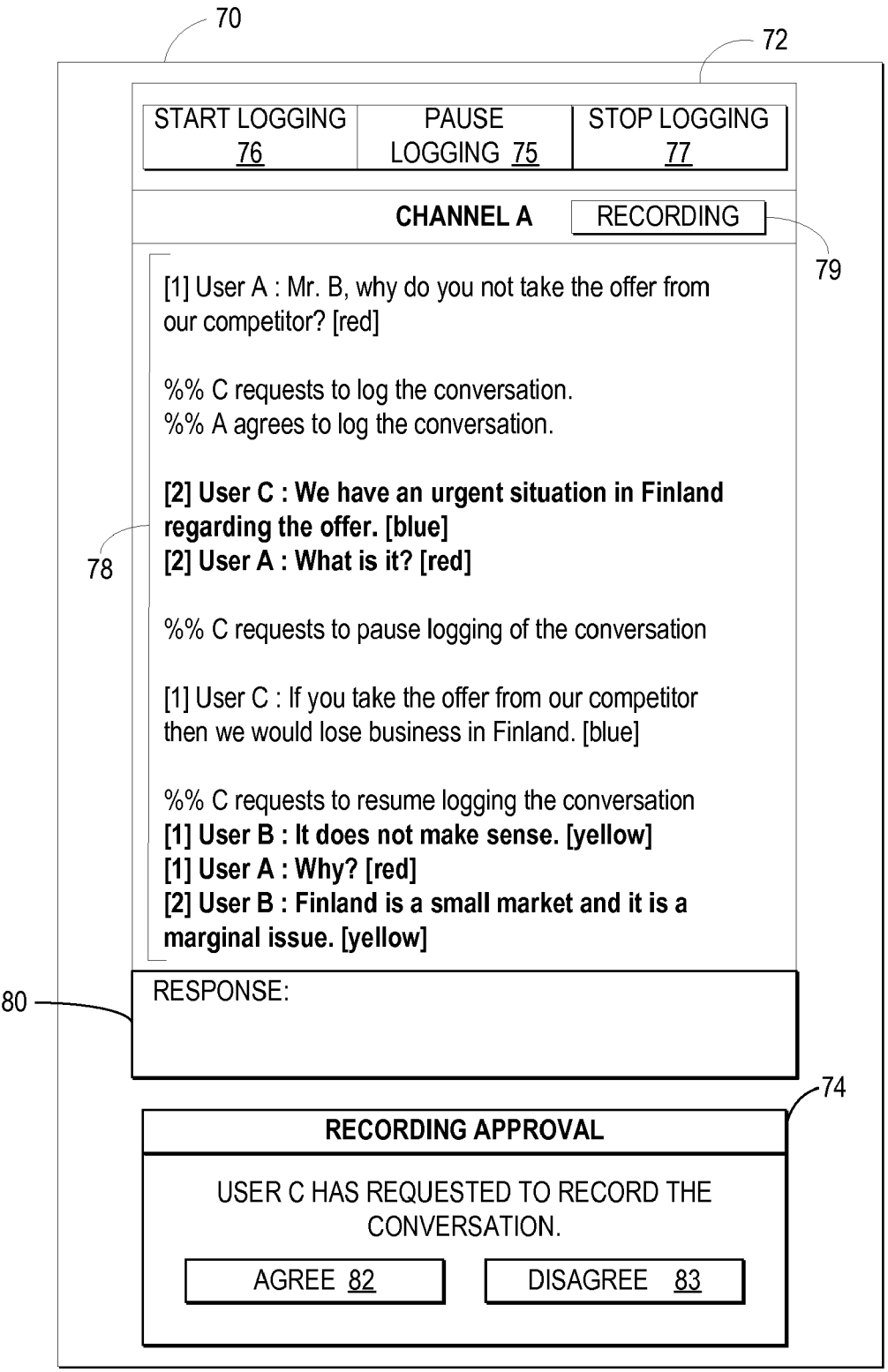
FIG. 5 depicts a graphical representation of a messaging session interface in accordance with the method, system and program of the present invention.

Referring now to FIG. 5, there is depicted a graphical representation of a messaging session interface in accordance with the method, system and program of the present invention. As depicted, a messaging session interface 70 includes a messaging session window 72 and a recording approval window 74.

Messaging session window 72 depicts selectable buttons 76, 75 and 77. In response to a user selecting selectable button 76, a request to log the conversation is transmitted to the messaging server. Then, in response to a user selecting selectable button 75, a request to pause logging of the conversation is transmitted to the messaging server. Further, in response to a user selecting selectable buttons 77, a request to stop logging the conversation is transmitted to the messaging server.

Messaging session entries 78 are also depicted within messaging session window 72. Messaging session entries 78 include message entries by users and textual references to logging activity by users. As illustrated within messaging session entries 78 message entries from users A and C are displayed. Then a textual reference to user C requesting to log the conversation is displayed. In addition, a textual reference to user A agreeing to log the conversation is provided.

Thereafter, the text of message entries within messaging session entries 78 is illustrated in bold to indicate that the entries are being recorded. Alternative types of textual indicators may also be utilized to indicate the message entries are being recorded. Moreover, graphical and audible indicators may also be utilized. For example, in the present invention, a recording graphic 79 illuminates when the message entries are being recorded. Particularly advantageous, where multiple users are recording portions of the same messaging session, a distinguishable indicator may be utilized to represent each separate recording.

In the present example, within messaging session entries 78 user C has also requested to pause the logging of the conversation. In particular, after a user requests to pause logging, a selection of selectable button 75 will result in the resuming the logging of the conversation. As depicted, when user C requests to pause logging, the next message entry is not indicated as being recorded. Thereafter, when logging resumes, message entries are once again depicted in a bolder text to indicate recording.

Further, in the present example, each entry within messaging session entries 78 is further graphically distinguished according to user and according to topic. In the present example, entries are distinguished by user according to a color associated with each entry indicated in brackets. Multiple topics within a single channel are distinguished by a graphical "[1]" and "[2]". In alternate embodiments, alternate types of graphical attachments may be utilized to distinguish between users and topics.

In the present embodiment, when recording starts, all entries are recorded regardless of user or topic. However, in alternate embodiments, a user may request to only record specific topics or entries by specific users. For example, in the present invention, user C may request to only record entries by user A and user C.

A response block 80 is also illustrated within messaging session window 72. Response block 80 is provided to allow a user to enter either a textual or vocal message to be included in the messaging session.

Recording approval window 74 includes selectable buttons 82 and 83. In response to a user selection of selectable button 82, an agreement to log the conversation is transmitted to the messaging server. Alternatively, in response to a user selection of selectable button 83, a disagreement against logging the conversation is transmitted to the messaging server.

If a user disagrees with recording a conversation, then entries by that user may be deleted from the log or, if that user has authority over the other users, recording of the messaging session may be limited. Alternatively, in the present example, the message entries could be recorded without authorization from the current user.

With reference now to FIG. 6, there is depicted a block diagram of a data storage structure for recording preferences according to user identification in accordance with the method, system and program of the present invention. As illustrated, the data corresponding to recording preferences is preferably stored in a data storage structure such as database table 150. The example database table 150 is provided in order to depict a selection of fields 152 which may be included in a data storage structure. Fields 152 include a user identification (ID), automatic agreement, automatic disagreement, notifications, and authorization levels. In alternate embodiments, alternate types of data storage structures and methods may be utilized. Further, database table 150 may be stored in a messaging server, client messaging system, or both. In addition, although not depicted, a user may select users, channels, and topics for which an automatic request to record will be initiated upon detection of one of the users, channels or topics.

The automatic agree and automatic disagree fields depict selections of users for which requests to record will automatically be agreed to or disagreed to. The notification fields include preferences for the types of recording notifications for each user ID based on which messaging device is being utilized in association with the user ID. In some cases, a user may request multiple types of notifications.

The authorization level fields include authorization labels that have been assigned to the user ID. For example, user A has the authorization level of "general", "manager", and "parent". As will be further described, authorizations according to authorization levels may be designated for each channel.

Referring now to FIG. 7, there is depicted a block diagram of a data storage structure of channel options set for multiple channels in accordance with the method, system and program of the present invention. As illustrated, the data corresponding to channel options is preferably stored in a data storage structure such as database table 160. The example database table 160 is provided in order to depict a selection of fields 162 which may be included in a data storage structure. Fields 162 include a channel and an authorization requirement. In alternate embodiments, alternate types of data storage structures and methods may be utilized.

In the examples depicted, recording message entries from channel A requires authorization of all general users participating in channel A. In the present embodiment, each user participating in a messaging session may be a general user.

Channel B requires authorization from all managers participating in the messaging session from channel B. Users are specified as managers according to user ID. For example, a corporation may specify managers for a selection of employee user IDs such that recording of messaging sessions in which those employees are participating requires approval from those managers.

Channel C blocks all recording except by a corporation A where advantageously, corporation A is not required to participate in the messaging session to record. Such a channel option allows a corporation to monitor and restrict recording of messaging sessions when channel C is utilized.

Channel D does not require authorizations for recording. Advantageously, users may select such a channel in order to record conversations without restrictions.

Figure 8:
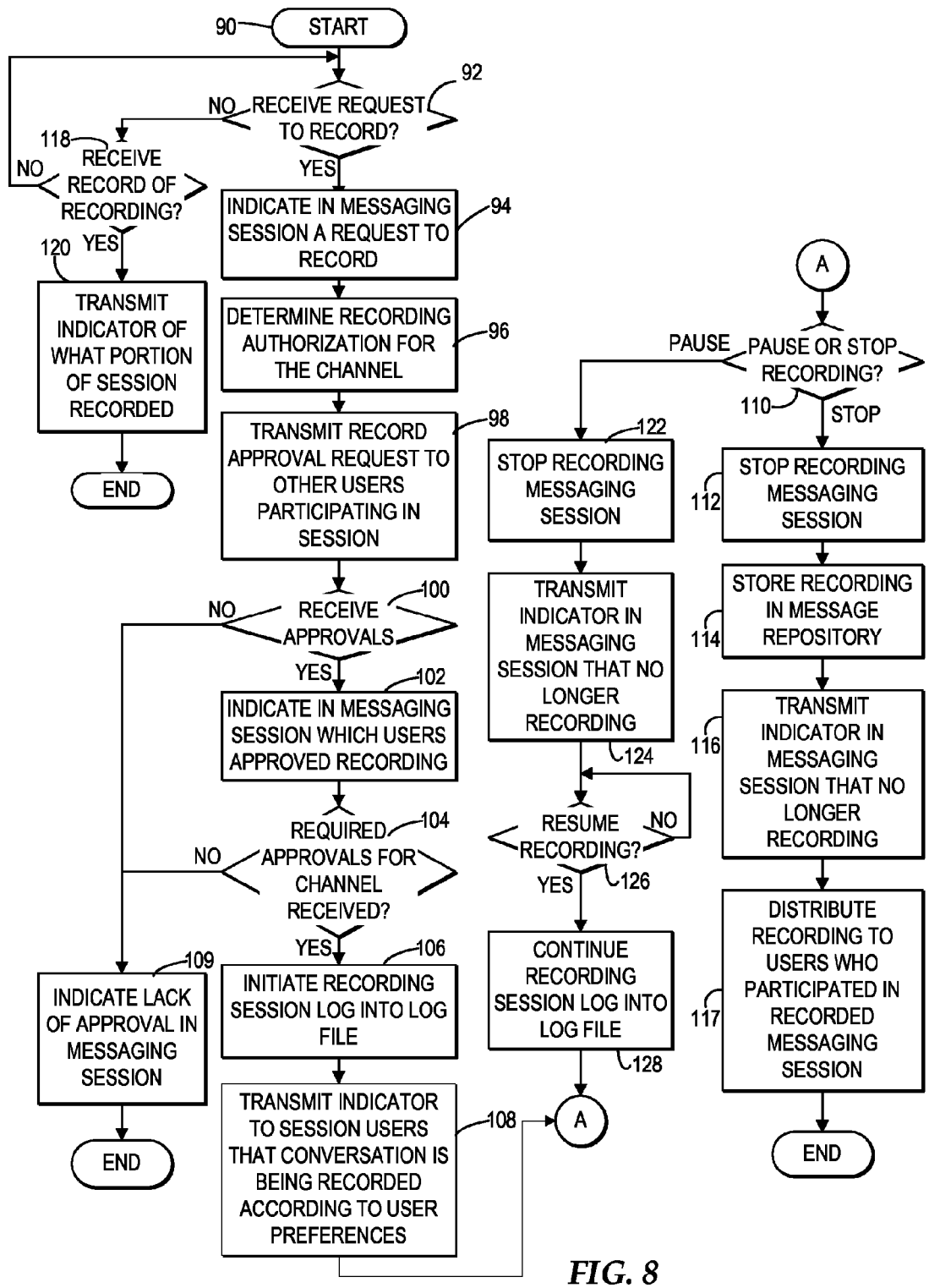
FIG. 8 depicts a high level logic flowchart of a process and program for controlling user recording of messaging sessions in accordance with the method, system, and program of the present invention.

With reference now to FIG. 8, there is depicted a high level logic flowchart of a process and program for controlling user recording of messaging sessions in accordance with the method, system, and program of the present invention. As illustrated, the process starts at block 90 and thereafter proceeds to block 92. Block 92 depicts a determination as to whether a request to record is received. In particular, a request to record may include a request to record portions of a messaging session already entered and may include other constraints on recording such as which user entries, which sections, which topics, etc. to record. If a request to record is not received, then the process passes to block 118. If a request to record is received, then the process passes to block 94.

Block 118 illustrates a determination as to whether or not a recording record is received. If a recording record is not received, then the process passes to block 92. If a recording record is received, then the process passes to block 120. Block 120 depicts transmitting an indicator of what portion of a messaging session was recorded to other users participating in the messaging session, and the process ends. In particular, where a user decides to utilize an alternate tool to record or save a messaging session, that use is advantageously detected at each client messaging system, transmitted to the messaging system and a notification transmitted to all users participating in the messaging system.

Block 94 illustrates indicating in the current messaging session that a request to record has been placed. Next, block 96 depicts determining recording authorization for the channel and the process passes to block 98. Recording authorization may be determined by recording options set for each channel, individual user authorization preferences, and an authorization status assigned to each user identification for use of the messaging server. For example, some user identifications may be provided with authorization to block recording by other users. In addition, some user identifications may be set to not require obtaining approval from other users to record the conversation.

Block 98 depicts transmitting approval requests to other users participating in the session according to recording authorization requirements. Next, block 100 illustrates a determination as to whether or not approvals have been received. If approvals have been received, then the process passes to block 102. If no approvals have been received, then the process passes to block 109. Block 109 depicts indicating a lack of approval in the messaging session and the process ends.

Block 102 illustrates indicating in the messaging session which users approved recording. Next, block 104 depicts a determination as to whether or not the required approvals for the channel are received according to the authorization requirements. If the required approvals for the channel are not received, then the process passes to block 109. If the required approvals for the channel are received, then the process passes to block 106.

Block 106 depicts initiating recording of the requested messaging session entries into a log file. Next, block 108 illustrates transmitting an indicator that the session is being recorded to each of the users participating in the session according to each user's alert preferences and the process passes to block 110.

Block 110 illustrated a determination as to whether a request to pause or stop is received when an event occurs. If a request to stop is received, then the process passes to block 112. If a request to pause is received, then the process passes to block 122.

Block 112 depicts stopping the recording of message entries into the log file for the recording session. Next, block 114 illustrates storing the log file in a message repository or transmitting the log file to users. Thereafter, block 116 depicts transmitting an indicator to each user that the conversation has stopped being recorded. Further, block 117 illustrates distributing the log file recording to users who participated in the messaging session, and the process ends.

Block 122 illustrates stopping the recording of message entries into the log file for the recording session. Next, block 124 depicts transmitting an indicator in the messaging session that the session is not being recorded. Thereafter, block 126 illustrates a determination as to whether a request to resume recording is received. If a request to resume recording is not received, then the process iterates at block 126. Otherwise, if a request to resume recording is received, then the process passes to block 128. Block 128 depicts continuing to record the session log into a log file, and the process passes to block 110.

Figure 9:
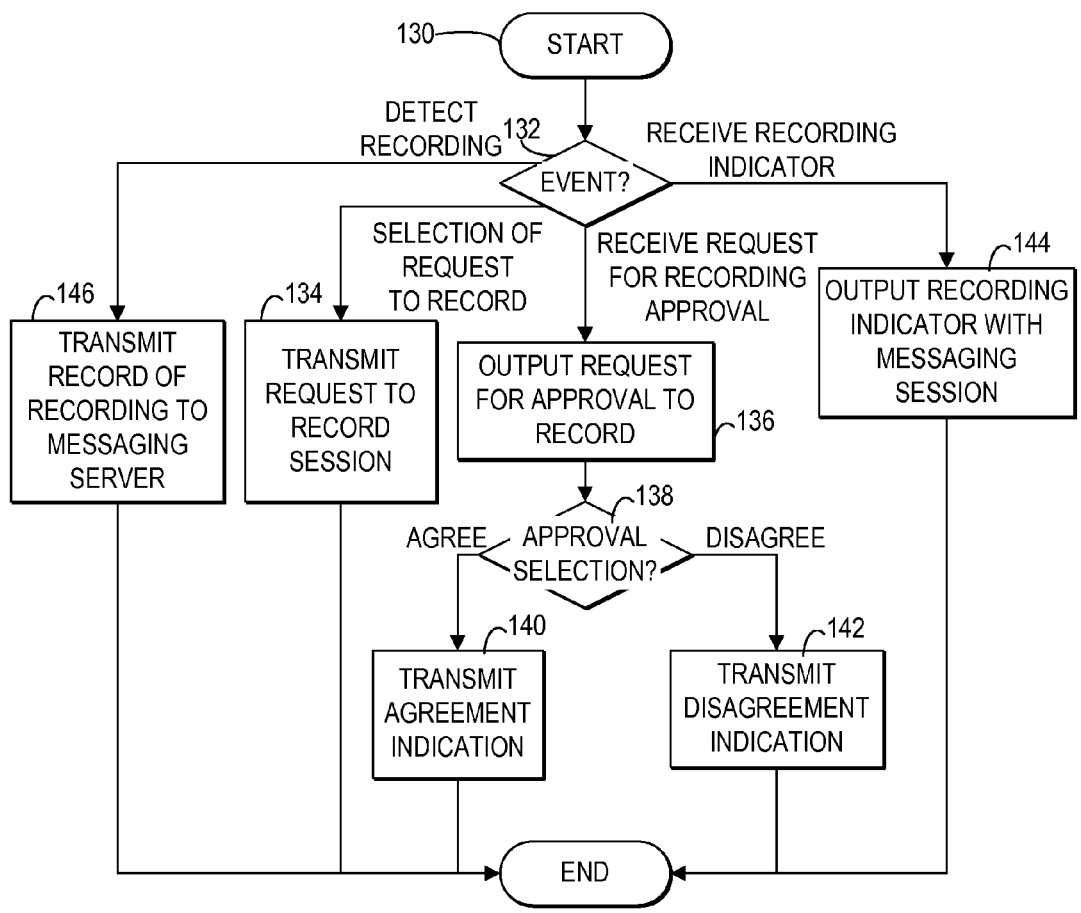
FIG. 9 illustrates a high level logic flowchart of a process and program for controlling client messaging session recording in accordance with the method, system and program of the present invention.

Referring now to FIG. 9, there is depicted a high level logic flowchart of a process and program for controlling client messaging session recording in accordance with the method, system and program of the present invention. As illustrated, the process starts at block 130 and thereafter proceeds to block 132. Block 132 depicts a determination as to which event occurred when an event occurs. If a request to record selection is received, then the process passes to block 134. If a request for recording approval is received, then the process passes to block 136. Otherwise if a recording indicator is received, then the process passes to block 144. If an alternate recording is detected, then the process passes to block 146.

Block 134 depicts transmitting the request to record the messaging session to the messaging server. In particular, parameters for recording the messaging session may be selected by the user in the request to record the messaging session. In addition, although not depicted, a request to pause and request to stop recording may be selected and transmitted to the messaging server. In addition, the request to record the messaging session may include parameters for pausing and stopping recording of the messaging session.

Block 136 illustrates outputting the request for approval to record. In particular, each user may set preferences for how the approval request is to be output. For example, one user may select for the approval request to be output in a separate graphical window. Another user may set a list of users where an agreement to record will always be returned.

Next, block 138 depicts a determination as to whether or not a user selected to agree or disagree with the recording request. If a user selects to agree, then the process passes to block 140 where the agreement indication is transmitted to the messaging server and the process ends. Alternatively, if a user selects to disagree, then the process passes to block 142 where the disagreement indication is transmitted to the messaging server and the process ends.

Block 144 depicts outputting a recording indicator with a messaging session and the process ends. In particular, a recording indicator may be specified by the messaging server and transmitted to the client messaging system. Or, alternatively, an indicator may be received and the client messaging system may specify the type of indicator from among textual, graphical and audible indicators requested.

Block 146 illustrates transmitting the record of recording to the messaging server and the process ends. In particular, the client messaging system may detect when an alternate form of recording is utilized by a user and record what data from the messaging session is recorded.

While the invention has been particularly shown and described with reference to a preferred embodiment, it will be understood by those skilled in the art that various changes in form and detail may be made therein without departing from the spirit and scope of the invention.

What is claimed is:

1. A method, in a particular client system from among a plurality of clients systems enabled to communicate with one another in a messaging session facilitated by a messaging server through at least one instant messaging channel via a network, for participating in a messaging session facilitated through a particular instant messaging channel, said method comprising the steps of:

controlling output in a window of a user interface at said particular client system to a user participating in said messaging session of entries associated with said messaging session received via said messaging server from a plurality of users participating in said messaging session;

in response to receiving a recording indicator for said messaging session from said messaging server indicating a recording request by a first user from among the plurality of users, adjusting said output in said window of said user interface at said particular client system to graphically distinguish a first selection of entries from among said plurality of message entries within said window which are being recorded into a separate log by said messaging server from a second selection of entries from among said plurality of message entries within said window not recorded into the separate log by applying a first textual attribute to only the first selection of entries from among the plurality of message entries, such that each separate user participating in said messaging session is notified of which message entries posted by said plurality of users are being recorded within said window containing all of said plurality of message entries.

2. The method for participating in a messaging session according to claim 1, wherein adjusting said output in said window of said user interface at said particular client system to graphically distinguish a first selection of entries from among said plurality of message entries within said window which are being recorded into a separate log by said messaging server further comprises the step of:

accessing a selection of preferences for said separate user specifying, for each of a plurality of types of client systems, at least one type of output characteristic to adjust to distinguish said selection of message entries being recorded; and adjusting said output in said user interface at said particular client system according to said type of output characteristic specified by said separate user for a particular type of said particular client system.

3. The method for participating in a messaging session according to claim 1, wherein adjusting said output in said window of said user interface at said particular client system to graphically distinguish a first selection of entries from among said plurality of message entries within said window which are being recorded into a separate log by said messaging server further comprises the step of:

accessing a selection of preferences for said separate user specifying, for each of said plurality of users, at least one type of output characteristic to adjust to distinguish said selection of message entries being recorded which are separately entered by each of said plurality of users; and adjusting said output in said user interface at said particular client system according to said type of output characteristic specified by said user separate for each separate other user from among said plurality of users which enters said selection of said plurality of message entries being recorded.

4. The method for participating in a messaging session according to claim 1, said method further comprising the step of:

in response to receiving a request to record by said first user at said particular client system, transmitting a request to record a specified selection of entries associated with said messaging session from said particular client system to said messaging server.

5. The method for participating in a messaging session according to claim 1, said method further comprising the steps of:

receiving, at said particular client system, from said messaging server, a recording approval request for recording a specified selection of entries associated with said messaging session;

presenting via said user interface, at said particular client system, a request for said separate user to approve said recording based on said recording approval request; and in response to an indication of approval selected by said separate user, transmitting said indication of approval from said particular client system to said messaging server.

6. The method for participating in a messaging session according to claim 1, said step of adjusting said output in said window of said user interface at said particular client system to graphically distinguish a first selection of entries from among said plurality of message entries within said window which are being recorded into a separate log by said messaging server, further comprising the step of:

adjusting in said window of said user interface at said particular client system, a graphical output characteristic of said first selection of entries from among said plurality of entries being recorded to distinguish said first selection of entries from among said plurality of message entries being recorded from said second selection of said plurality of message entries.

7. The method for participating in a messaging session according to claim 1, said step of adjusting said output in said window of said user interface at said particular client system to graphically distinguish a first selection of entries from among said plurality of message entries within said window which are being recorded into a separate log by said messaging server, further comprising the step of:

adjusting in said window of said user interface at said particular client system, an audible output characteristic of said first selection of entries from among said plurality of entries being recorded to distinguish said first selection of entries from among said plurality of message entries being recorded from said second selection of said plurality of message entries.

8. The method of claim 1, further comprising:

in response to receiving a second recording indicator for said messaging session from said messaging server indicating a second recording request by a second user from among the plurality of users, adjusting said output in said window of said user interface at said particular client system to graphically distinguish a third selection of entries from among said the plurality of message entries within said user interface which are being recorded into a second separate log by said messaging server from a fourth selection of entries from among said plurality of message entries in said window not being recorded into the second separate log by applying a second textual attribute to only the third selection of entries from among the plurality of entries.

9. A system for participating in a messaging session, said system comprising:

a particular client messaging system from among a plurality of client systems communicatively connected to a network, wherein said plurality of client systems are enabled to communicate with one another through a messaging session facilitated by a messaging server through an instant messaging channel via a network;

said particular client messaging system comprising a processor and a memory and operative to control output in a window of a user interface to a user participating in a messaging session of entries associated with said messaging session received via said messaging server from a plurality of users participating in said messaging session; and said particular client messaging system operative, in response to receiving a recording indicator for said messaging session from said messaging server indicating a recording request by a first user from among the plurality of users, to adjust said output in said window of said user interface at said particular client system to graphically distinguish a first selection of entries from among said plurality of message entries within said window which are being recorded into a separate log by said messaging server from a second selection of entries from among said plurality of message entries within said window not recorded into the separate log by applying a first textual attribute to only the first selection of entries from among the plurality of message entries, such that each separate user participating in said messaging session is notified of which message entries posted by said plurality of users are being recorded within said window containing all of said plurality of message entries.

10. The system for participating in a messaging session according to claim 9, further comprising:

said particular client messaging system operative to transmit said request to record a specified selection of entries associated with said messaging session to said messaging server, in response to receiving a request to record by said first user.

11. The system for participating in a messaging session according to claim 9, further comprising:

said particular client messaging system operative to receive a recording approval request from said messaging server for recording a specified selection of entries associated with said messaging session;

said particular client messaging system operative to present a request in said user interface for said separate user to approve said recording based on said recording approval request; and said particular client messaging system operative to transmit said indication of approval to said messaging server, in response to an indication of approval selected by said separate user.

12. The system for participating in a messaging session according to claim 9, further comprising:

said particular client messaging system operative to adjust in said window of said user interface a graphical output characteristic of said first selection of entries from among said plurality of entries being recorded to distinguish said first selection from among said plurality of message entries being recorded from said second another unrecorded selection of said plurality of message entries.

13. The system for participating in a messaging session according to claim 9, further comprising:

said particular client messaging system operative to adjust in said window of said user interface an audible output characteristic of said first selection of entries from among said plurality of entries being recorded to distinguish said first selection of entries from among said plurality of message entries being recorded from said second selection of said plurality of message entries.

14. The system for participating in a messaging session according to claim 9, further comprising:

said particular client messaging system operative, in response to receiving a second recording indicator for said messaging session from said messaging server indicating a second recording request by a second user from among the plurality of users, to adjust said output in said window of said user interface at said particular client system to graphically distinguish a third selection of entries from among said the plurality of message entries within said user interface which are being recorded into a second separate log by said messaging server from a fourth selection of entries from among said plurality of message entries in said window not being recorded into the second separate log by applying a second textual attribute to only the third selection of entries from among the plurality of entries.

15. A computer program product for participating in a messaging session comprising a non-transitory computer usable medium having stored thereon a computer-readable program which when executed on a computer system cause said computer system to:

enable a client system to communicate with at least a selection of a plurality of client systems via at least one messaging session facilitated by a messaging server through an instant messaging channel via a network;

control output in a window of a user interface to a user participating in said messaging session of entries associated with said messaging session received via said messaging server from a plurality of users participating in said messaging session; and adjust, in response to receiving a recording indicator for said messaging session from said messaging server indicating a recording request by a first user from among the plurality of users, said output in said window of said user interface at said particular client system to graphically distinguish a first selection of entries from among said plurality of message entries within said window which are being recorded into a separate log by said messaging server from a second selection of entries from among said plurality of message entries within said window not recorded into the separate log by applying a first textual attribute to only the first selection of entries from among the plurality of message entries, such that each separate user participating in said messaging session is notified of which message entries posted by said plurality of users are being recorded within said window containing all of said plurality of message entries.

16. The program for participating in a messaging session according to claim 15, said computer-readable program which when executed on said computer system further causing said computer system to:

transmit a request to record a specified selection of entries associated with said messaging session to said messaging server, in response to receiving a request to record by said first user.

17. The program for participating in a messaging session according to claim 15, said computer-readable program which when executed on said computer system further causing said computer system to:

receive a recording approval request from said messaging server at said client system for recording a specified selection of entries associated with said messaging session; and present, at said client system in said user interface, a request for said separate user to approve said recording based on said recording approval request; and transmit said indication of approval to said messaging server, in response to an indication of approval selected by said separate user.

18. The program for participating in a messaging session according to claim 15, said computer-readable program which when executed on said computer system further causing said computer system to:

adjust in said user interface at said client system, a graphical output characteristic of said first selection from among said plurality of entries being recorded to distinguish said first selection from among said plurality of message entries being recorded from said second selection of said plurality of message entries.

19. The program for participating in a messaging session according to claim 15, said computer-readable program which when executed on said computer system further causing said computer system to:

adjust in said user interface at said client system, an audible output characteristic of said first selection from among said plurality of entries being recorded to distinguish said first selection from among said plurality of message entries being recorded from said second selection of said plurality of message entries.

20. The program for participating in a messaging session according to claim 15, said computer-readable program which when executed on said computer system further causing said computer system to:

in response to receiving a second recording indicator for said messaging session from said messaging server indicating a second recording request by a second user from among the plurality of users, adjust said output in said window of said user interface at said particular client system to graphically distinguish a third selection of entries from among said the plurality of message entries within said user interface which are being recorded into a second separate log by said messaging server from a fourth selection of entries from among said plurality of message entries in said window not being recorded into the second separate log by applying a second textual attribute to only the third selection of entries from among the plurality of entries.

\* \* \* \* \*